United States Patent [19]

Raniero

[11] 4,205,510
[45] Jun. 3, 1980

[54] SAFETY LAWN MOWER

[76] Inventor: John J. Raniero, Box 204, Gearhart, Oreg. 97138

[21] Appl. No.: 922,869

[22] Filed: Jul. 7, 1978

[51] Int. Cl.$^2$ ............................................ A01D 35/262
[52] U.S. Cl. .................................... 56/12.9; 56/13.4; 56/16.9; 56/17.4; 56/320.1; 56/295
[58] Field of Search ...................... 56/12.8, 12.9, 13.4, 56/13.1, 16.9, 320.1, 320.2, 255, 295, 17.4, 16.4

[56] References Cited

U.S. PATENT DOCUMENTS

| | | | |
|---|---|---|---|
| 2,318,430 | 5/1943 | Spahn | 56/17.4 |
| 2,706,372 | 4/1955 | Blydenburgh | 56/12.9 |
| 3,059,400 | 10/1962 | Plummer | 56/295 |
| 3,096,608 | 7/1963 | Williamson | 56/295 |
| 3,098,337 | 7/1963 | Teachworth | 56/17.4 |
| 3,134,212 | 5/1964 | Gary | 56/16.4 |
| 3,283,488 | 11/1966 | Franklin | 56/295 |
| 3,338,039 | 8/1967 | Nightingale | 56/295 |

Primary Examiner—Jay N. Eskovitz
Attorney, Agent, or Firm—Chernoff & Vilhauer

[57] ABSTRACT

An improved rotary lawn mower utilizing a novel cutting apparatus for increased safety. The cutting apparatus comprises a cutting wheel disposed within a blade cover, a protective housing releasably suspended by the blade cover beneath the cutting wheel, and a fan incorporated into the cutting wheel for drawing grass upwardly through slots in the protective housing and discharging the grass cuttings. The cutting wheel comprises a central hub for attachment to the drive shaft of the lawn mower engine, a plurality of radially-extending, horizontally-oriented rotary cutting blades, and a peripheral rim. A radial-flow fan is formed by the rim, and the cutting blades form an axial-flow fan, both of which produce an air flow which draws grass through the slots and discharges the cuttings through a discharge port of the blade cover. The cutting blades and the edges of the slots in the bottom of the wheel housing cooperate with a scissors-like shearing action to cut grass which is drawn up through the slots by the air flow. Blades and openings in the rim which form the radial-flow fan also serve to mulch the grass clippings before they are discharged. Annular skids welded to the bottom of the wheel housing provide a minimum spacing between the cutting blades and the ground and reinforces the wheel housing.

10 Claims, 6 Drawing Figures

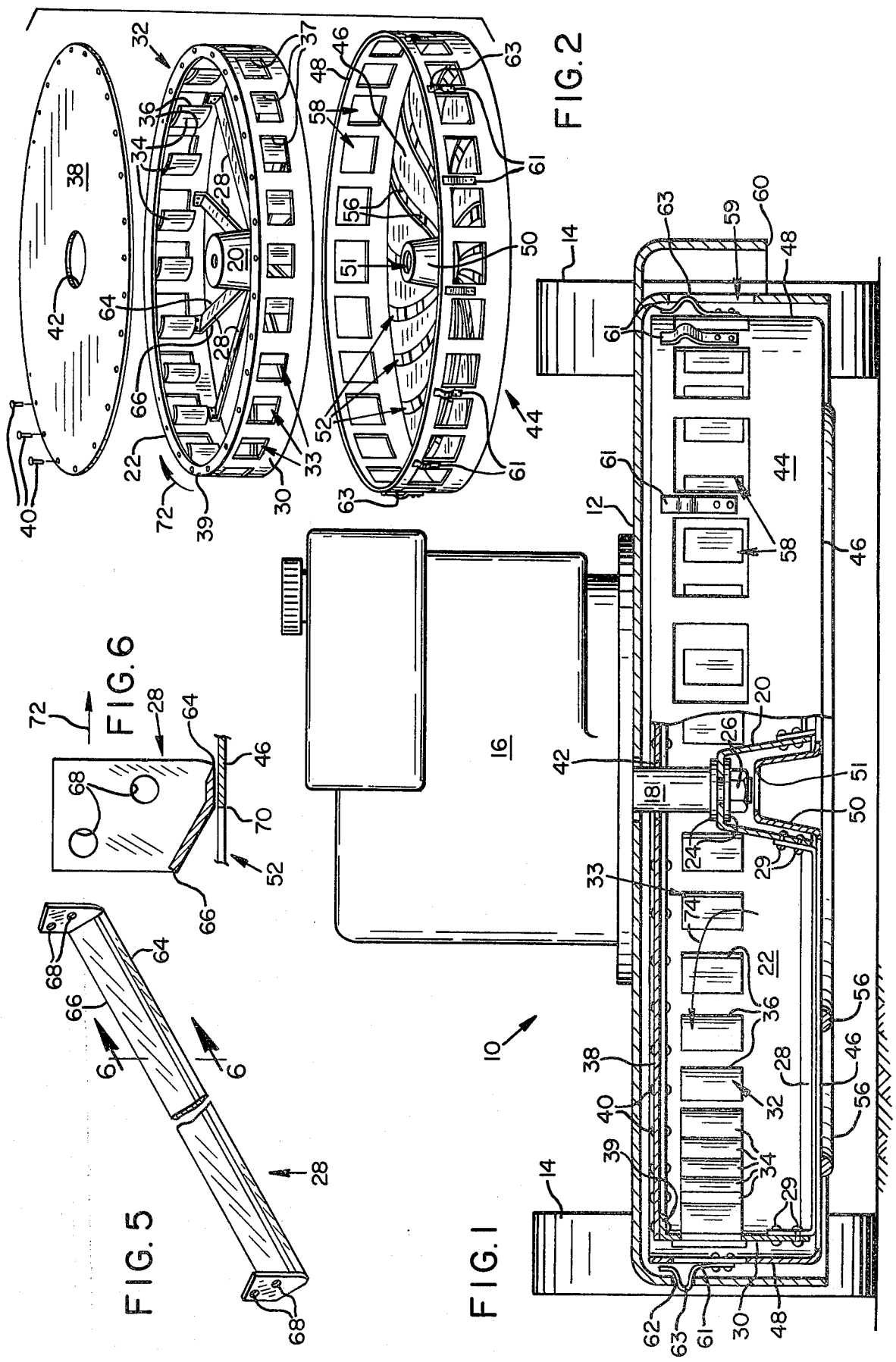

SAFETY LAWN MOWER

BACKGROUND OF THE INVENTION

This invention relates to rotary lawn motors and particularly to cutting apparatus for use with rotary lawn mowers to improve their safety and effectiveness.

Rotary lawn mowers having horizontally-oriented, radially-disposed blades rotated by an engine with a vertically-oriented drive shaft are well known. Typically, the cutting element of such lawn mowers comprises an elongate flat steel blade which is securely attached at its center to the vertical shaft so that the blade rotates in a horizontal plane. The trailing edge of the blade may be slightly upturned so that the blade produces an upward draft tending to raise grass to a vertical position for cutting, for example, as shown in Halsten U.S. Pat. No. 3,959,954, and the leading edges are sharpened for a short distance from each end of the blade for cutting grass.

Properly maintained such a lawn mower effectively cuts grass on even terrain. However, where the ground is bumpy the blade tips often cut extremely close to the ground, "scalping" the lawn and picking up small pebbles or sticks, which nick and dull the cutting edges, and the blades may even strike the ground, causing the engine to stall. More importantly, because of the high speed of the rotating tips of such a lawn mower blade, any stones, sticks, or other debris which are picked up by the blade are very likely to be expelled at a great velocity, endangering the operator or bystanders. In addition, if the grass is very tall then it may be too heavy to be entirely lifted by the suction of a conventional blade and the lawn mower itself may push the grass down as it rolls over the grass, with the result that the grass is cut unevenly. Further, it is often desirable, especially when mowing tall grass, to chop the grass finely as it is being cut, and to distribute the cuttings over the trimmed lawn as mulch, which is not very well accomplished by conventional rotary mowers.

Although some attempts have been made to overcome the aforementioned problems of conventional rotary mowers, none has been successful in overcoming all of the problems. For example, Watrous U.S. Pat. No. 2,669,826 discloses a skid disposed below the center of its rotary blade to space the blade from the ground, but the skid fails to prevent the blade from scalping the lawn or picking up small rocks due to tipping of the blade where the ground is uneven or bumpy since there is only one point of contact of the skid with the ground. Philips, Jr., et al U.S. Pat. No. 2,953,888 and Messner U.S. Pat. No. 3,905,181 disclose rotary blade mechanisms which include a bottom cover over a part of their respective blades which would reduce the tendency of the blades to scalp the ground and thrown debris, but in order to cut grass a large area of blades is left uncovered and the function of those covers is to contain grass after it has been cut, rather than to prevent the entry of debris. Geier U.S. Pat. No. 4,051,647 and Watrous, as well as Halsten, disclose blade mechanisms which tend to raise grass to an upright position for cutting; however all of those mechanisms are somewhat limited by their configurations in the amount of updraft that they can produce. In addition, Halsten and Messner disclose specific types of apparatus for mulching grass after it is cut.

Accordingly, there is a need for an improved rotary lawn mower that simultaneously increases operational safety and mower durability, prevents scalping of the grass being cut, raises tall and heavy grass into a cutting element for uniform cutting, and creates a mulch from the cut grass.

SUMMARY OF THE INVENTION

The aforementioned drawbacks and shortcomings of prior art rotary mowers are overcome by the present invention, which provides a novel rotary lawn mower having a rotary cutting wheel placed within a blade cover, a protective wheel housing suspended from the blade cover below the cutting wheel and a fan for generating a strong air suction to draw grass through the wheel housing into the cutting wheel and thereafter discharge the grass cuttings. The wheel housing prevents the cutting wheel from throwing rocks and scalping the ground, and also interacts with the cutting wheel to cut the grass with a shearing affect to provide a more assured cut.

The cutting wheel is mounted on a vertical shaft in the manner conventional for attaching a cutting blade to a rotary lawn mower, and comprises a central hub to which a plurality of radially-extending, horizontally-oriented rotary cutting blades are attached, the outer ends of which are attached to a cylindrical rim. Preferably, the blades are attached to the hub and the rim in such a manner that they may be individually removed for sharpening or replacement. The leading edge of each blade is sharpened for cutting grass, and the trailing edge extends upwardly at an angle, so that as the cutting wheel rotates in the direction of the leading edges the upturned trailing edges of the blades operate as an axial-flow fan which creates a vertical flow of air through the blades of the cutting wheel.

The strength of the air suction created by the fan is attributable in large degree to the upper portion of the peripheral rim, which contains a plurality of openings and corresponding fan blades extending inwardly and forwardly in the direction of rotation from the trailing edge of each opening, thereby forming a radial-flow fan which withdraws air from the space within the peripheral rim and above the cutting blades. The tips of the radial fan blades and the trailing edges of the openings are sharpened to reduce the size of grass cuttings further, thereby producing a fine grass mulch. A deflection shield is attached to the top of the cutting wheel, which encloses the space above the cutting blades, helping to direct the air flow radially outward through the openings in the peripheral rim.

The wheel housing, which shields the cutting blades of the cutting wheel and prevents the suction of the cutting apparatus from picking up large objects, has a flat bottom portion disposed adjacent to and shielding the cutting blades of the cutting wheel, and a plurality of radially extending, S-curved slots formed in the bottom portion through which grass is drawn by the air suction produced by the cutting wheel so that the grass may be cut by the cutting wheel. The slots may be relatively narrow yet still draw the grass upwardly for cutting due to the high suction produced by the peripheral, radial-flow fan formed by the cutting wheel rim and the axial-flow fan formed by the blades of the cutting wheel. A scissors-like shearing effect is achieved by the rotating cutting blades and the edges of the slots of the bottom portion. The curvature of the slots ensures that the blades will cut continuously, thereby maximizing effectiveness and minimizing vibration, and that the blades and slot edges will not collide, or "catch".

The wheel housing is attached to the lawn mower blade cover by means of resilient clips having U-shaped portions which extend outwardly through locating holes in the blade cover and may be displaced inwardly to allow the wheel housing to be removed for cleaning and adjustment. Protection against scalping and further protection against picking up of small rocks and pebbles is provided by a pair of concentric circular skids welded to the bottom portion of the wheel housing and projecting downward to provide a minimum spacing between the bottom of the housing and the ground.

It is therefore a principal objective of the present invention to provide a new and improved rotary lawn mower.

It is another objective of this invention to provide such a rotary lawn mower which is safer to operate and protects the lawn from scalping.

It is a further objective of the invention to provide such a lawn mower which more effectively cuts grass in a uniform manner and creates a fine mulch of the grass cuttings.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a front, sectional view of an exemplary embodiment of a lawn mower according to the present invention.

FIG. 2 is an exploded view of a cutting apparatus of the lawn mower shown in FIG. 1.

FIG. 5 is a perspective view of a cutting blade of the cutting apparatus shown in FIG. 2.

FIG. 6 is a sectional view of the cutting blade of FIG. 5 taken along line 6—6 thereof.

DETAILED DESCRIPTION OF THE INVENTION

Figure 4:
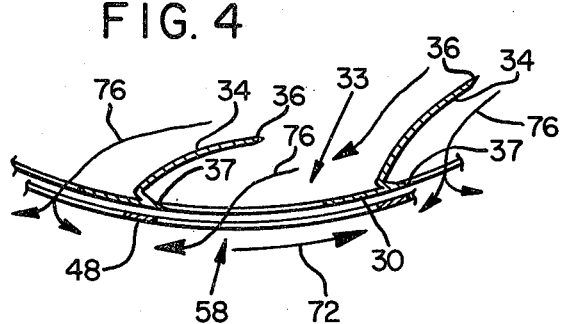
FIG. 4 is a sectional, detail view of a radial-flow fan portion of the cutting apparatus shown in FIG. 2.

Referring to FIG. 1, an exemplary embodiment 10 of the improved lawnmower of the present invention comprises a blade cover 12, to which four wheels 14 are rotatably attached, and upon which an engine 16 is mounted. A vertical drive shaft 18 extends downwardly from the engine 16 through the upper portion of the blade cover 12 for rotating a cutting element. However, instead of a conventional blade which may readily be reached through the bottom opening of the blade cover, a novel rotary cutting wheel 22 is attached to the drive shaft for rotation within the blade cover, and the cutting wheel is shielded by a wheel housing 44 suspended beneath the cutting wheel from the blade cover.

Turning now to FIG. 2, as well as FIG. 1, the cutting wheel 22 comprises a plurality of cutting blades 28 which extend radially from a hub 20 to a generally cylindrical, peripheral rim 30 which extends upwardly and is attached to and supported by the cutting blades 28. A radial-flow, or "squirrel cage", fan 32 is formed in the upper portion of the rim by a plurality of fan openings 33 and a corresponding plurality of inwardly-extending radial fan blades 34, spaced apart around the circumference of the rim 30, each fan blade extending from the rim 30 toward the direction of rotation, as shown in FIGS. 2 and 4, to produce outwardly directed air flow. The wheel 22 is releasably attached at its hub 20 to the drive shaft 18, preferably by a pair of flat washers 24 and a threaded fastener such as nut 26 so that the wheel may readily be removed for maintenance.

A circular deflector shield 38, having a diameter equal to that of the cutting wheel 22, is fastened to an upper edge 39 of the rim 30 by releasable metal fasteners, such as sheet metal screws 40. The central portion of the deflector shield 38 has a circular aperture 42 defined therein for receiving the vertical shaft 18.

A protective wheel housing, generally designated 44, is suspended below the cutting wheel and comprises a horizontal bottom portion 46 covering the bottom of the cutting wheel and an integrally-formed, upwardly-projecting wall portion 48 attached to the sides of the blade cover 12. A cup-shaped center portion 50 is oriented with its opening downward and extends upwardly from the bottom portion 46 of the housing into the hub 20. A circular aperture 51 in the top of the center portion provides access to the nut 26 by which the cutting wheel is attached to the drive shaft 18.

Figure 3:
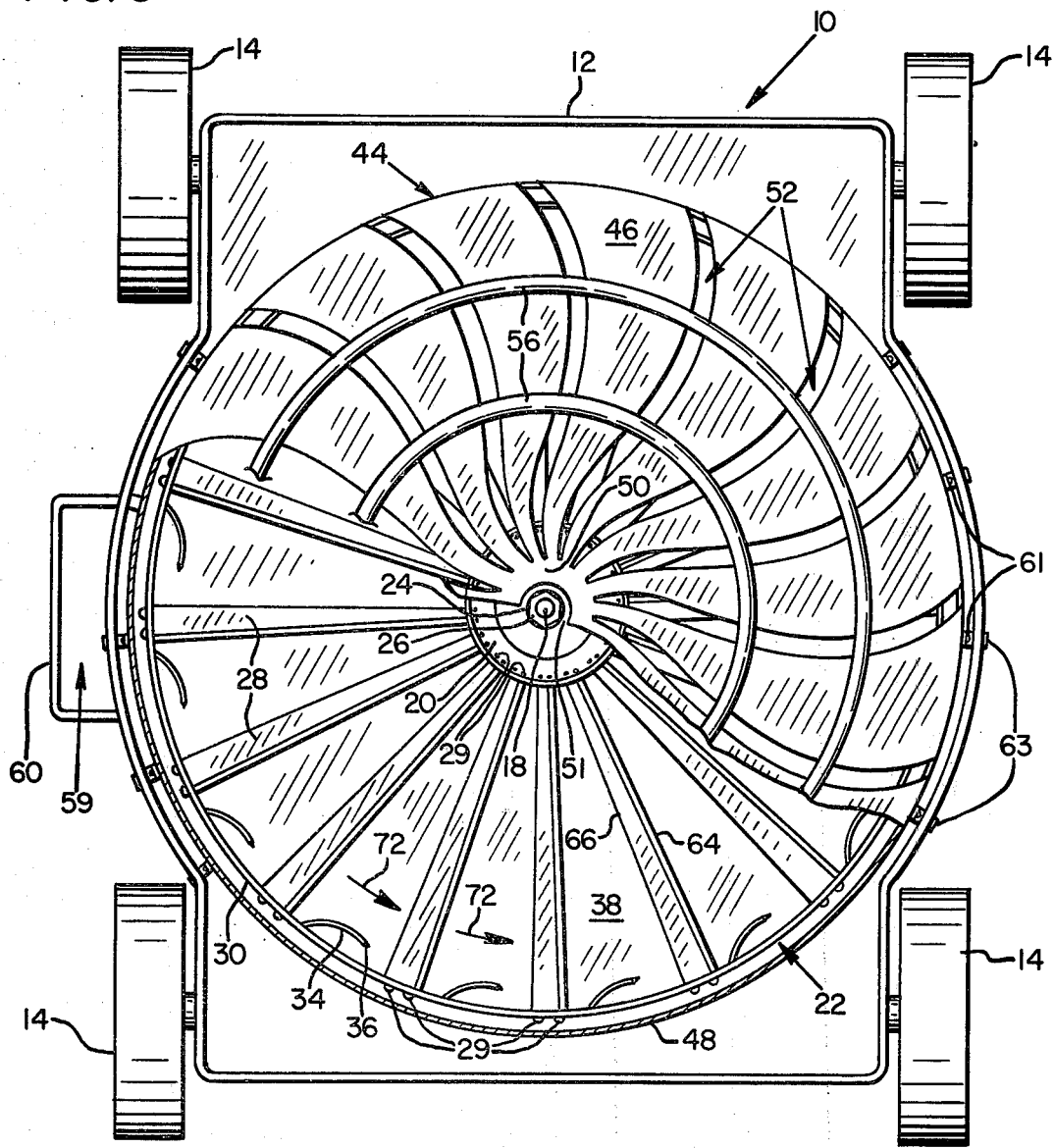
FIG. 3 is a partially cut-away, bottom view of the lawn mower shown in FIG. 1.

The bottom portion 46 of the wheel housing 44 defines a plurality of radially-extending slots 52, seen in FIGS. 2 and 3, through which grass is drawn for cutting. The slots are S-shaped to allow each rotary cutting blade 28 of the cutting wheel to cut continuously, thus making maximum use of the cutting surface and tending to reduce stress and vibration. The slots may be made of such a width that grass can be drawn upwardly through them but that most rocks and other debris would not pass through them, thereby preventing such debris from being thrown by the mower.

Concentrically arranged circular skids 56 are placed, preferably by welding, on the underside of the horizontal bottom portion 46 of the wheel housing where they provide the bottom portion with support and rigidity. The skids have a half-round cross-section whose thickness produced a predetermined minimum separation between the cutting blades and the ground, thereby protecting the grass from scalping and preventing the blades from striking small rocks and pebbles.

A plurality of exhaust ports 58 are arranged circumferentially around the wall portion 48 of the wheel housing at a height aligned with the radial fan blade openings 33 for permitting the cut grass to escape the cutting wheel. Where the cutting wheel is included as a standard part of a lawn mower, the blade cover 12 may be provided with a plurality of discharge ports 59 spaced around the periphery of the cover for permitting cut grass to escape from the exhaust ports 58. However, where a conventional lawn mower is utilized and the cutting apparatus of the present invention is used as an attachment, only one discharge port 59, and a corresponding discharge deflector 60, would ordinarily be provided. In any case, the multiple exhaust ports 58 enable the wheel housing to be attached to the blade cover with little concern for port alignment.

The entire wheel housing 44 is supported and located with respect to the lawn mower blade cover 12 by means of a plurality of resilient clips 61, preferably made of metal, which are fixedly attached to the wall portion 48 of the wheel housing. The clips are vertically-oriented and have U-shaped tip portions 63 which extend outwardly through locating apertures 62 defined in the sides of the blade cover 12 and may be pressed inwardly to clear the cover, thereby allowing removal of the wheel housing from the mower.

Referring to FIGS. 5 and 6, showing a rotary cutting blade 28 in greater detail, it can be seen that the cutting blade had a leading edge 64, which is sharply formed at the lower surface thereof, and a trailing edge 66, which preferably extends upwardly at an angle from the plane of rotation of the leading edge 64. The leading edges of the cutting blades 28 work in conjunction with cutting edges 70 of the slots 52 in the wheel housing to produce a shearing action similar to scissors, which facilitates the cutting of grass, and the upturned trailing edges 66 of the cutting blades act as fan blades which cause axial air flow into the cutting wheel, thereby facilitating the suction of grass into the cutting blades. Holes 68 in the ends of the blades accommodate removable metal fasteners such as rivets 29, seen in FIG. 1, which removably secure the blades 28 to the hub 20 and the rim 30 of the cutting wheel.

The curvature of the slots 52 produces a scissors-like movement of the point of intersection between the leading edges 64 of the cutting blades and the cutting edge 70 of the slots in the wheel housing as the cutting wheel is rotated. This reduces cycle loading and unloading of the cutting blades 28 which would be present if slots were straight sided. This shape also helps to prevent an edge 64 of a rotating cutting blade from catching on a cutting edge 70 of a slot, which would otherwise damage the cutting wheel or the wheel housing.

In operation of the lawn mower, the engine 16 rotates the vertical drive shaft 18, which in turn rotates the cutting wheel 22, including its cutting blades 28 and radial-flow fan 32, in the direction indicated by the arrows 72, as shown in FIGS. 2, 3, 4 and 6. The bottom portion of wheel housing 44 prevents large objects from reaching the leading edges 64 of the cutting blades. The skids 56 on the bottom of the wheel housing provide spacing between the bottom of the wheel housing and the ground over which the lawn mower is moved. Thus, if one or more of the wheels 14 should encounter a relatively low place in the ground, or if a hump should be between the wheels 14, the skids 56 will prevent the cutting wheel 22 from striking the ground, which would scalp the grass and dull the cutting blades, or throw stones, dirt, etc., in a possibly dangerous manner.

As the cutting wheel is rotated the exceptionally strong suction, produced primarily by the radial fan 32 but also by the upturned edges of the cutting blades 28, draws grass in the area being moved upwardly through the slots 52, where the interaction between the leading edges 64 and the cutting edges 70 shears the grass evenly. The grass cuttings follow the path of the fan-driven air, encounter the deflection shield 38, and are deflected outwardly away from the hub 20, as indicated by arrow 74 in FIG. 1, toward the radial fan 32. As shown by arrows 76 in FIG. 4, the radial fan 32 urges the air and cut grass outward between the radial fan elements 34 whose blade tips 36 and trailing opening edges 37 are sharpened to mulch the grass. The mulched cuttings may then exit through the wheel housing 44 by way of the exhaust port 58 to the discharge port 59 and are thereafter deflected downward toward the ground by the deflector 60.

When it becomes necessary to clean the cutting apparatus of the lawn mower, the resilient clips 61 may be pressed inwardly, releasing them from the locating apertures 62 and allowing the wheel housing to be lowered from beneath the cutting wheel 22. The sheet metal screws 40 used to hold the deflection shield 38 in place upon the cutting wheel 22 also allow the deflection shield to be removed easily for cleaning or replacement of the cutting blades 28.

The terms and expressions which have been employed in the foregoing abstract and specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. An improved rotary lawn mower having a blade cover with a discharge port, an engine mounted over said blade cover, and a vertically-oriented rotatable shaft driven by said engine, the improvement comprising:
   (a) a cutting wheel disposed within said blade cover, said cutting wheel having a central hub attached to said shaft and a plurality of horizontally-oriented cutting blades attached to and extending radially from said central hub, each said blade having a sharpened leading edge for cutting grass as said wheel is rotated in the direction thereof;
   (b) a wheel housing suspended from said blade cover below said cutting wheel, said wheel housing having a horizontally-oriented bottom portion disposed adjacent said cutting blades and defining a plurality of radially-extending slots therein for receiving grass to be cut; and
   (c) fan means incorporated into said cutting wheel for creating air flow upwardly through said slots in said wheel housing and out said discharge port to draw grass through said slots where it may be cut by said cutting blades and discharged through said discharge port, said fan means comprising a peripheral rim attached to the outer ends of said cutting blades, a plurality of openings defined in said peripheral rim, and corresponding radial-flow fan blade means attached to said rim for forcing air outwardly through said rim openings and said discharge port when said wheel is rotated in the direction of said leading edges of said cutting blades, thereby reducing air pressure within said cutting wheel 2. The lawn mower of claim 1 wherein said wheel housing slots are curved to allow each cutting blade to cut continuously.

3. The lawn mower of claim 1 wherein said wheel housing comprises skid means fixedly attached to the bottom side thereof for separating said bottom portion of said wheel housing from the ground a predetermined minimum amount.

4. The lawn mower of claim 3 wherein said skid means comprises an annular projection attached to said bottom portion of said wheel housing.

5. The lawn mower of claim 1 wherein said cutting wheel hub is a cup-shaped member attached at its top to said shaft, and said bottom portion of said cutting wheel housing includes a centrally located aperture defined therein for access to the interior of said hub.

6. The lawn mower of claim 1 wherein said cutting blades are attached to said central hub of said cutting wheel and to said cutting wheel rim by removable fastener means.

7. The lawn mower of claim 1 wherein said fan means further comprises upwardly tilted trailing edges of said cutting blades, whereby said blades operate as an axial-flow fan which draws air through said slots in said wheel housing.

8. The lawn mower of claim 1 wherein said wheel housing further comprises an upwardly extending wall portion at the periphery thereof for suspending said wheel housing from said blade cover, said wall portion having an opening defined therein for passing air and grass from said openings in said cutting wheel rim to said discharge port, and clip means for releasably attaching said wall portion to said blade cover.

9. The lawn mower of claim 1 further comprising a circular deflection shield fixedly attached to the top of said cutting wheel rim for deflecting air and cut material toward said rim, said deflection shield having a centrally located hole defined therein for receiving said rotatable shaft.

10. The lawn mower of claim 1 wherein said fan blade means comprise fan blades associated with corresponding rim openings, said fan blades being directed inwardly and in the direction of said leading edges of said cutting blades, said fan blades and edges of said openings in said wheel rim being sharpened to mulch grass cuttings as they are expelled through said rim openings.

* * * * *